(12) United States Patent  (10) Patent No.: US 8,700,563 B1
Thomson et al.  (45) Date of Patent: Apr. 15, 2014

(54) DETERMINISTIC DATABASE SYSTEMS

(75) Inventors: Alexander Thomson, New Haven, CT (US); Daniel J. Abadi, New Haven, CT (US)

(73) Assignee: Yale University, New Haven, CT (US)

( * ) Notice: Subject to any disclaimer, the term of this patent is extended or adjusted under 35 U.S.C. 154(b) by 75 days.

(21) Appl. No.: 13/548,915

(22) Filed: Jul. 13, 2012

Related U.S. Application Data

(60) Provisional application No. 61/508,186, filed on Jul. 15, 2011.

(51) Int. Cl.
 *G06F 17/30* (2006.01)
(52) U.S. Cl.
 CPC .... *G06F 17/30171* (2013.01); *G06F 17/30371* (2013.01); *G06F 17/30227* (2013.01); *G06F 17/30592* (2013.01)
 USPC ........... 707/607; 707/705; 707/782; 707/781; 707/615; 709/201; 709/203; 709/213; 709/217
(58) Field of Classification Search
 USPC .......... 707/607, 615, 705, 781, 782; 709/201, 709/203, 213, 217
 See application file for complete search history.

(56) References Cited

U.S. PATENT DOCUMENTS

| | | | | |
|---|---|---|---|---|
| 5,438,509 A | * | 8/1995 | Heffron | 718/100 |
| 6,895,529 B2 | * | 5/2005 | Egolf et al. | 714/15 |
| 7,111,023 B2 | * | 9/2006 | Norcott | 1/1 |
| 7,908,257 B2 | * | 3/2011 | Mittal et al. | 707/704 |
| 8,494,948 B2 | * | 7/2013 | Quraishi et al. | 705/37 |
| 2002/0046156 A1 | * | 4/2002 | Horn et al. | 705/37 |
| 2002/0065911 A1 | * | 5/2002 | von Klopp et al. | 709/224 |
| 2003/0167219 A1 | * | 9/2003 | Quraishi et al. | 705/36 |
| 2003/0195918 A1 | * | 10/2003 | Horn et al. | 709/102 |
| 2006/0167895 A1 | * | 7/2006 | Shim | 707/10 |
| 2008/0059469 A1 | * | 3/2008 | Pruet | 707/8 |

* cited by examiner

*Primary Examiner* — Frantz Coby
(74) *Attorney, Agent, or Firm* — Chapin IP Law, LLC

(57) ABSTRACT

In an embodiment, a plurality of transactions for accessing a database may be acquired. The database may be associated with a plurality of locks. The plurality of transactions may include a first transaction, a second transaction, and a third transaction. A logical serialization sequence for executing the transactions may be identified. The logical serialization sequence may indicate that (1) the first transaction is to be executed before the second transaction based on all locks that are required by the first transaction being available; (2) the second transaction is to be executed after the first transaction has completed execution based on the second transaction requiring a lock that is required by the first transaction; and (3) the third transaction is to be executed before or during execution of the first transaction based on all locks required by the third transaction being different than the locks required by the first transaction.

14 Claims, 11 Drawing Sheets

US 8,700,563 B1

DETERMINISTIC DATABASE SYSTEMS

RELATED APPLICATIONS

This application claims the benefit of U.S. Provisional Patent Application No. 61/508,186, titled "Deterministic Database Systems", which was filed on Jul. 15, 2011 and which the contents thereof are incorporated by reference in their entirety as though fully set forth herein.

STATEMENT AS TO RIGHTS TO INVENTIONS MADE UNDER FEDERALLY SPONSORED RESEARCH AND DEVELOPMENT

This invention was made with government support under contract No. IIS-0845643 awarded by the National Science Foundation. The government has certain rights in the invention.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements. Also, the following detailed description does not limit the invention.

Various traditional concurrency control protocols used in database systems may exhibit nondeterministic behavior. For example, these protocols tend to allow multiple transactions to execute in a system in parallel, interleaving database reads and writes, while guaranteeing a certain equivalence between a final database state and a state which would have resulted had the transactions been executed in some serial order. The agnosticism of serialization exhibited by these protocols often means that an order of execution of the transactions may not be determined in advance by the protocols. Instead, in these protocols, the order of execution of the transactions may be dependent on a vast array of factors that may be entirely orthogonal to an order in which transactions may have entered the system. This in turn may lead to nondeterministic behavior. Nondeterministic behavior in database systems may cause complications in an implementation of, for example, database replication or horizontally scalable distributed databases. Embodiments described herein may address shortcomings associated with nondeterministic behavior that may be associated with various traditional concurrency control protocols used in database systems.

Figure 1:
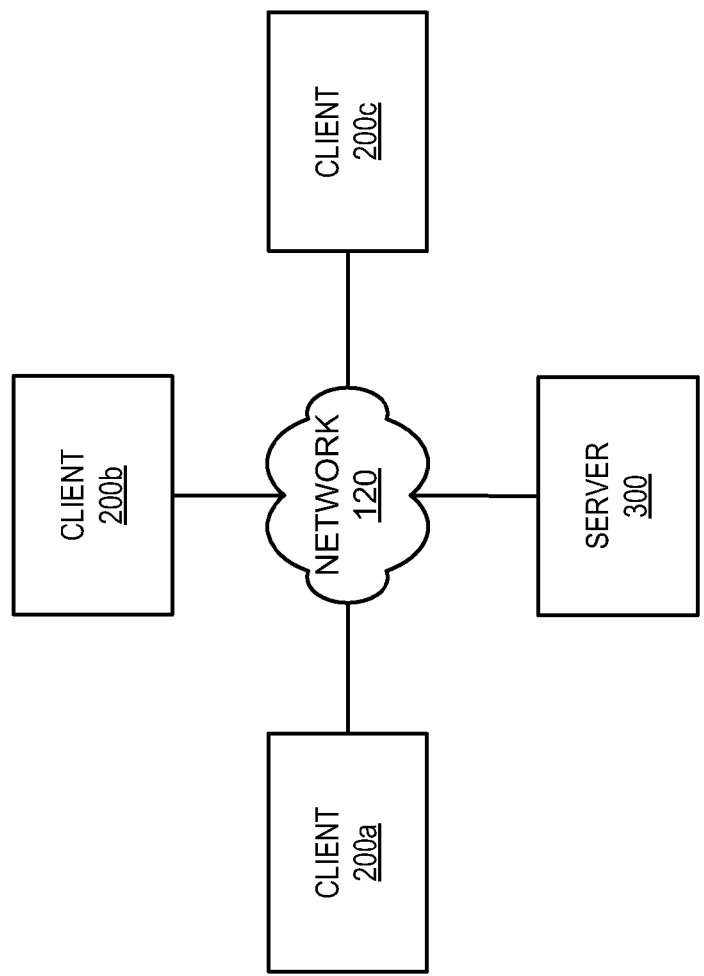
FIG. 1 illustrates a block diagram of an example of a system that includes a plurality of client nodes and a server node coupled via a network.

FIG. 1 illustrates a block diagram of an example embodiment of a system 100 that may implement one or more embodiments of the invention. Referring to FIG. 1, system 100 may include a plurality of client nodes 200a-c and a server node 300 that may communicate via a network 120.

Network 120 may be a communications network that may enable information (e.g., data) to be exchanged between client nodes 200a-c and server node 300. The information may be exchanged using various protocols, such as, for example, Internet Protocol (IP), Asynchronous Transfer Mode (ATM) protocol, Synchronous Optical Network (SONET) protocol, the User Datagram Protocol (UDP), Transmission Control Protocol (TCP), the Institute of Electrical and Electronics Engineers (IEEE) 802.11 protocol and/or some other protocol. The information may be contained in one or more data packets that may be formatted according to various protocols. The packets may be unicast, multicast, and/or broadcast to/from client nodes 200a-c and server node 300.

Network 120 may include various network devices, such as, for example, gateways, routers, switches, firewalls, servers, repeaters, address translators, and/or other network devices. Portions of the network 120 may be wired (e.g., using wired conductors, optical fibers) and/or wireless (e.g., using free-space optical (FSO), radio frequency (RF), acoustic transmission paths). Portions of network 120 may include an open public network, such as the Internet. Portions of the network 120 may include a more restricted network, such as a private intranet, virtual private network (VPN), restricted public service network, and/or some other restricted network. Portions of network 120 may include a wide-area network (WAN), metropolitan area network (MAN), and/or a local area network (LAN). Portions of network 120 may be broadband, baseband, or some combination thereof. Implementations of network 120 and/or devices operating in or on network 120 may not be limited with regards to, for example, information carried by the network 120, protocols used in the network 120, and/or the architecture/configuration of the network 120.

It should be noted that FIG. 1 illustrates an example of a system that may implement one or more embodiments of the invention. Other systems that may implement one or more embodiments of the invention may include more components or fewer components than the components illustrated in FIG. 1. For example, a system that may implement one or more embodiments of the invention may include multiple server nodes 300.

Also, functions performed by various components contained in other systems, that may implement one or moiré embodiments of the invention, may be distributed among components in the systems differently than as described herein. For example, various functions described herein that may be performed by server node 300 may be performed in other systems that may implement one or more embodiments of the invention in other nodes, such as, for example, a client node 200 and/or across several nodes in a distributed system (e.g., across server node 300 and one or more client nodes 200, across several client nodes 200, across several server nodes 300).

Figure 2:
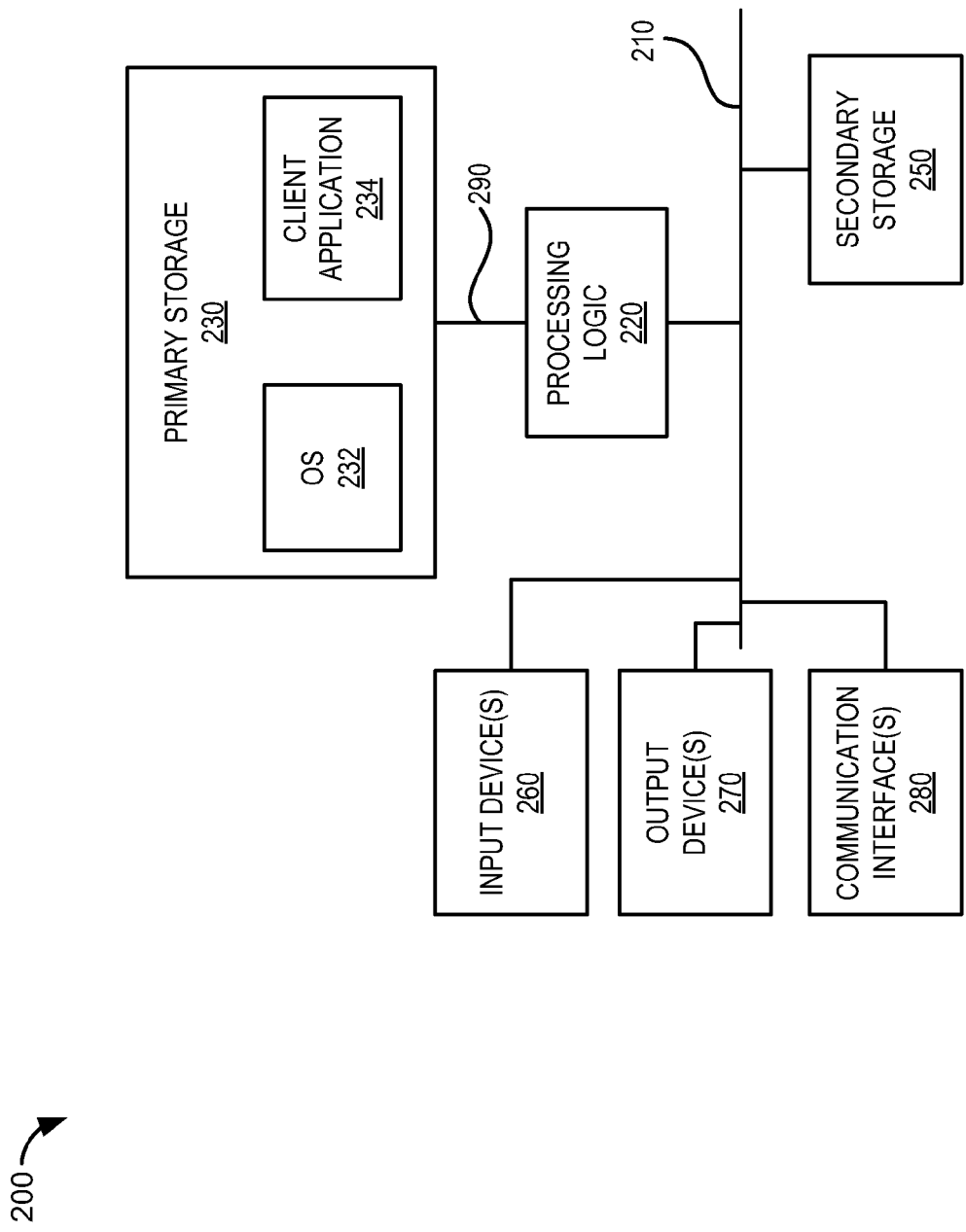
FIG. 2 illustrates a block diagram of an example embodiment of a client node.

Client node 200 may be a computing device, such as for example, a desktop computer, laptop computer, mainframe computer, personal digital assistant (PDA), netbook computer, tablet computer, web-enabled cellular telephone, smart phone, or some other computing device. FIG. 2 illustrates a block diagram of an example embodiment of a client node 200. Referring to FIG. 2, client node 200 may include various components, such as, processing logic 220, primary storage 230, secondary storage 250, one or more input devices 260, one or more output devices 270, and one or more communication interfaces 280.

It should be noted that FIG. 2 illustrates an example embodiment of client node 200. Other embodiments of client node 200 may include computing devices that may have more components or fewer components than the components illustrated in FIG. 2. Also, functions performed by various components contained in other embodiments of client node 200 may be distributed among the components differently than as described herein.

Client node 200 may include an I/O bus 210 that may enable communication among components in client node 200, such as, for example, processing logic 220, secondary storage 250, input devices 260, output devices 270, and communication interfaces 280. The communication may include, among other things, transferring information (e.g., control information, data) between the components.

Client node 200 may also include memory bus 290 that may enable information to be transferred between processing logic 220 and primary storage 230. The information may include instructions and/or data that may be executed, manipulated, and/or otherwise processed by processing logic 220. The information may be stored in primary storage 230.

Processing logic 220 may include logic for interpreting, executing, and/or otherwise processing information contained in, for example, primary storage 230 and/or secondary storage 250. Processing logic 220 may include a variety of heterogeneous hardware. For example, the hardware may include some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), and/or other types of processing logic that may interpret, execute, manipulate, and/or otherwise process the information. Processing logic 220 may comprise a single core or multiple cores. An example of a processor that may be used to implement processing logic 220 is the Intel Xeon processor available from Intel Corporation, Santa Clara, Calif.

Secondary storage 250 may include storage that may be accessible to processing logic 220 via I/O bus 210. The storage may store information for processing logic 220. The information may be executed, interpreted, manipulated, and/ or otherwise processed by processing logic 220. Secondary storage 250 may include, for example, one or more storage devices, such as magnetic disk drives, optical disk drives, random-access memory (RAM) disk drives, flash drives, solid-state drives, or other storage devices. The information may be stored on one or more non-transitory tangible computer-readable media contained in the storage devices. Examples of non-transitory tangible computer-readable media that may be contained in the storage devices may include magnetic discs, optical discs, and memory devices (e.g., flash memory devices, static RAM (SRAM) devices, dynamic RAM (DRAM) devices, or other memory devices). The information may include data and/or computer-executable instructions that may implement one or more embodiments of the invention.

Input devices 260 may include one or more devices that may be used to input information into client node 200. The devices may include, for example, a keyboard, computer mouse, microphone, camera, trackball, gyroscopic device (e.g., gyroscope), mini-mouse, touch pad, stylus, graphics tablet, touch screen, joystick (isotonic or isometric), pointing stick, accelerometer, palm mouse, foot mouse, puck, eyeball controlled device, finger mouse, light pen, light gun, neural device, eye tracking device, steering wheel, yoke, jog dial, space ball, directional pad, dance pad, soap mouse, haptic device, tactile device, neural device, multipoint input device, discrete pointing device, and/or some other input device. The information may include spatial (e.g., continuous, multi-dimensional) data that may be input into client node 200 using, for example, a pointing device, such as a computer mouse. The information may also include other forms of data, such as, for example, text that may be input using a keyboard.

Output devices 270 may include one or more devices that may output information from client node 200. The devices may include, for example, a cathode ray tube (CRT), plasma display device, light-emitting diode (LED) display device, liquid crystal display (LCD) device, vacuum florescent display (VFD) device, surface-conduction electron-emitter display (SED) device, field emission display (FED) device, haptic device, tactile device, printer, speaker, video projector, volumetric display device, plotter, touch screen, and/or some other output device. Output devices 270 may be directed by, for example, processing logic 220, to output the information from client node 200. The information may be presented (e.g., displayed, printed) by output devices 270. The information may include, for example, text, graphical user interface (GUI) elements (e.g., windows, widgets, and/or other GUI elements), and/or other information that may be presented by output devices 270.

Communication interfaces 280 may include logic for interfacing client node 200 with, for example, one or more communication networks and enable client node 200 to communicate with one or more entities coupled to the communication networks. For example, client node 200 may include a communication interface 280 for interfacing client node 200 to network 120. The communication interface 280 may enable client node 200 to communicate with other nodes that may be coupled to network 120, such as, for example, server node 300. Note that client node 200 may include other communication interfaces 280 that may enable client node 200 to communicate with nodes on other communications networks.

Communication interfaces 280 may include one or more transceiver-like mechanisms that may enable client node 200 to communicate with entities (e.g., nodes) coupled to the communications networks. Examples of communication interfaces 280 may include a built-in network adapter, network interface card (NIC), Personal Computer Memory Card International Association (PCMCIA) network card, card bus network adapter, wireless network adapter, Universal Serial Bus (USB) network adapter, modem, and/or other device suitable for interfacing client node 200 to a communications network, such as network 120.

Primary storage 230 may include one or more non-transitory tangible computer-readable media that may store information for processing logic 220. Primary storage 230 may be accessible to processing logic 220 via memory bus 290. The information may include computer-executable instructions and/or data that may implement operating system (OS) 132 and client application 234. The instructions may be executed, interpreted, and/or otherwise processed by processing logic 220.

Primary storage 230 may comprise a RAM that may include one or more RAM devices for storing information (e.g., data, executable instructions, or other information). The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (Fe-RAM) devices, magneto-resistive RAM (MRAM) devices, phase change memory RAM (PRAM) devices, or other types of RAM devices.

OS 232 may be a conventional operating system that may implement various conventional operating system functions that may include, for example, (1) scheduling one or more portions of client application 234 to run on (e.g., be executed by) the processing logic 220, (2) managing primary storage 230, and (3) controlling access to various components in client node 200 (e.g., input devices 260, output devices 270, communication interfaces 280, secondary storage 250) and information received and/or transmitted by these components.

Examples of operating systems that may be used to implement OS 232 may include the Linux operating system, Microsoft Windows operating system, the Symbian operating system, Mac OS operating system, and the Android operating system. A distribution of the Linux operating system that may be used is Red Hat Linux available from Red Hat Corporation, Raleigh, N.C. Versions of the Microsoft Windows operating system that may be used include Microsoft Windows Mobile, Microsoft Windows 7, Microsoft Windows Vista, and Microsoft Windows XP operating systems available from Microsoft Inc., Redmond, Wash. The Symbian operating system is available from Accenture PLC, Dublin, Ireland. The Mac OS operating system is available from Apple, Inc., Cupertino, Calif. The Android operating system is available from Google, Inc., Menlo Park, Calif.

Client application 234 may be an application (e.g., software application) that may run under control of OS 232 on client node 200. Client application 234 may contain provisions for generating transaction requests to access (e.g., read, write) information that may be managed by server node 300. The information may be stored in a database that may be managed by server node 300. The database may reside at server node 300.

Figure 3:
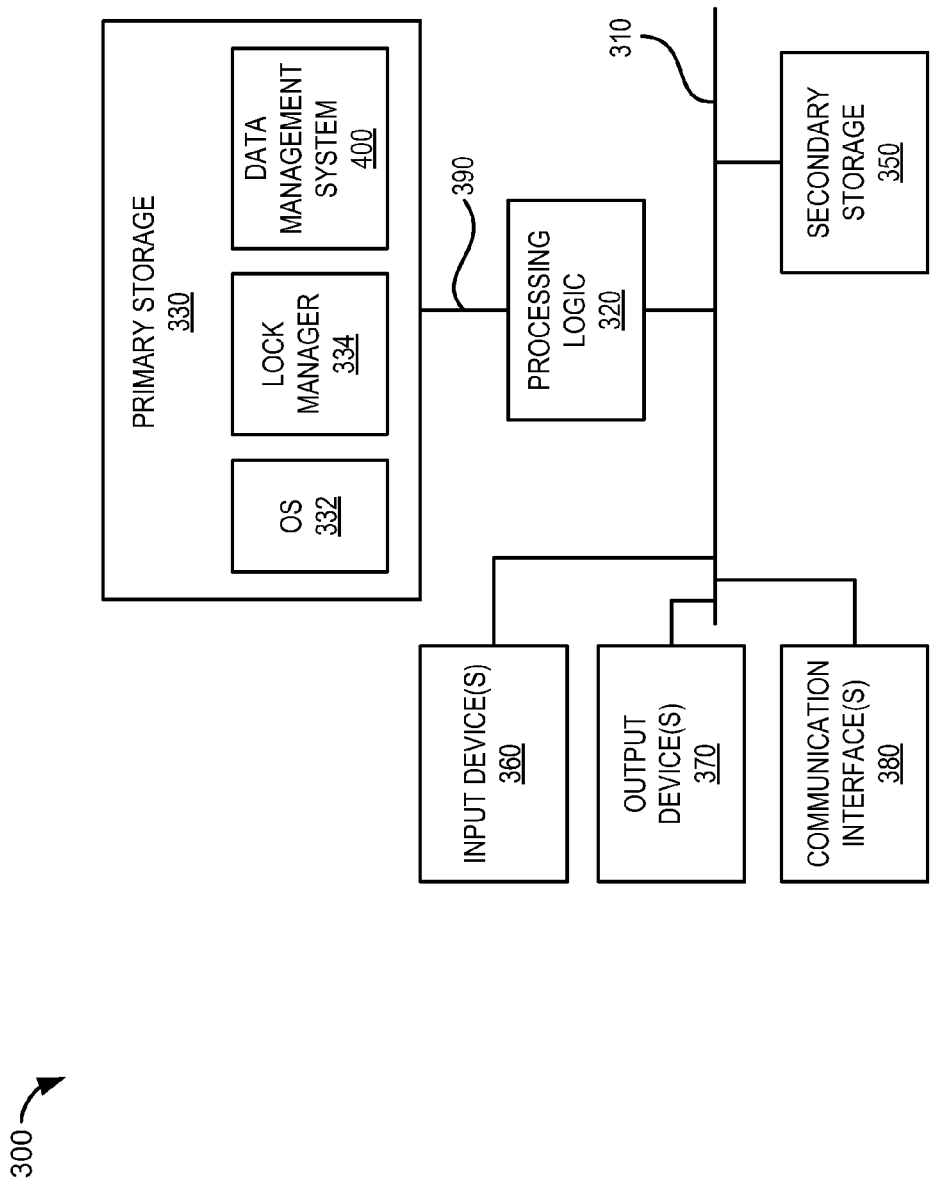
FIG. 3 illustrates a block diagram of an example embodiment of a server node.

Server node 300 may be a computing device, such as for example, a desktop computer, laptop computer, mainframe computer, blade server, tower server, rack server, or some other computing device. FIG. 3 illustrates an example block diagram of server node 300. Referring to FIG. 3, server node 300 may include various components, such as, processing logic 320, primary storage 330, secondary storage 350, one or more input devices 360, one or more output devices 370, and one or more communication interfaces 380.

It should be noted that FIG. 3 illustrates an example embodiment of server node 300. Other embodiments of server node 300 may include computing devices that may have more components or fewer components than the components illustrated in FIG. 3. Also, functions performed by various components contained in other embodiments of server node 300 may be distributed among the components differently than as described herein.

Server node 300 may include an I/O bus 310 that may enable communication among various components in server node 300, such as, for example, processing logic 320, secondary storage 350, input devices 360, output devices 370, and communication interfaces 380. The communication may include, among other things, transferring information (e.g., control information, data) between the components.

Server node 300 may include a memory bus 390 that may enable information to be transferred between processing logic 320 and primary storage 330. The information may include instructions and/or data that may be executed, manipulated, and/or otherwise processed by processing logic 320. The information may be stored in primary storage 330.

Processing logic 320 may include logic for interpreting, executing, and/or otherwise processing information contained in, for example, primary storage 330 and/or secondary storage 350. Processing logic 320 may include a variety of heterogeneous hardware, such as the heterogeneous hardware described above.

Secondary storage 350 may include storage that may be accessible to processing logic 320 via I/O bus 310. The storage may store information for processing logic 320. The information may be executed, interpreted, manipulated, and/or otherwise processed by processing logic 320. Secondary storage 350 may include, for example, one or more storage devices, such as magnetic disk drives, optical disk drives, random-access memory (RAM) disk drives, flash drives, solid-state drives, or other storage devices. The information may be stored on one or more non-transitory tangible computer-readable media contained in the storage devices. Examples of non-transitory tangible computer-readable media that may be contained in the storage devices may include magnetic discs, optical discs, and memory devices (e.g., flash memory devices, static RAM (SRAM) devices, dynamic RAM (DRAM) devices, or other memory devices). The information may include data and/or computer-executable instructions that may implement one or more embodiments of the invention.

Input devices 360 may include one or more devices that may be used to input information into server node 300. The devices may include, for example, various input devices such as described above.

Output devices 370 may include one or more devices that may output information from server node 300. The devices may include, for example, various output devices, such as described above.

Output devices 370 may be directed by, for example, processing logic 320, to output the information from server node 300. The information may be presented (e.g., displayed, printed) by output devices 370. The information may include, for example, text, graphical user interface (GUI) elements (e.g., windows, widgets, and/or other GUI elements), and/or other information that may be presented by output devices 370.

Communication interfaces 380 may include logic for interfacing server node 300 with, for example, one or more communication networks and enable server node 300 to communicate with one or more entities coupled to the communication networks. For example, server node 300 may include a communication interface 380 for interfacing server node 300 to network 120. The communication interface 380 may enable server node 300 to communicate with other nodes (e.g., client nodes 200*a-c*) that may be coupled to network 120. Note that server node 300 may include other communication interfaces 380 that may interface with other communications networks and enable server node 300 to communicate with entities (e.g., nodes) on the other networks.

Communication interfaces 380 may include one or more transceiver-like mechanisms that may enable server node 300 to communicate with entities (e.g., nodes) coupled to the communications networks. Examples of communication interfaces 380 may include a built-in network adapter, network interface card (NIC), Personal Computer Memory Card International Association (PCMCIA) network card, card bus network adapter, wireless network adapter, Universal Serial Bus (USB) network adapter, modem, and/or other device suitable for interfacing server node 300 to a communications network, such as network 120.

Primary storage 330 may include one or more tangible computer-readable media that may store information for processing logic 320. Primary storage 330 may be accessible to processing logic 320 via memory bus 390. The information may include computer-executable instructions and/or data that may implement operating system (OS) 332, lock manager 334, and data management system 400. The instructions may be executed, interpreted, and/or otherwise processed by processing logic 320. The instructions may include instructions that may implement one or more embodiments of the invention.

Primary storage 330 may comprise a RAM that may include one or more RAM devices for storing information (e.g., data, executable instructions, or other information). The RAM devices may be volatile or non-volatile and may include, for example, various RAM devices, such as described above.

OS 332 may be a conventional operating system that may implement various conventional operating system functions that may include, for example, (1) scheduling one or more portions of data management system 400 and/or lock manager 334 to run on the processing logic 320, (2) managing primary storage 330, and (3) controlling access to various components in server node 300 (e.g., input devices 360, output devices 370, communication interfaces 380, secondary storage 350) and information received and/or transmitted by these components. Examples of operating systems that may be used to implement OS 332 may include the Linux operating system, Microsoft Windows operating system, the Symbian operating system, Mac OS operating system, and the Android operating system.

Lock manager 334 may include provisions for managing locks that may be used by data management system 400 to control access to a database that may be managed by data management system 400. The locks may be associated with entities (e.g., records, tables, fields) associated with the database that may contain data. The entities may be stored in the database. A lock for an entity may be acquired by a requestor by issuing a request for the lock to the lock manager 334. The lock manager 334 may acquire the request and process it. Processing the request may include granting the lock to the requestor or rejecting the request based on various criteria. For example, if the lock is available, the lock manager 334 may grant the lock to the requestor. On the other hand, if the lock is unavailable, the lock manager 334 may reject the request.

It should be noted that while in FIG. 3 lock manager 334 is illustrated as being separate from data management system 400, in other embodiments, lock manager 334 may be part of data management system 400. Also, in other embodiments, lock manager may reside and operate at a node other than server node 300. For example, some or all of the functions performed by lock manager 334 may be performed at one or more client nodes 200.

Data management system 400 may include provisions for managing data. These provisions may include provisions for receiving transaction requests from client nodes 200*a-c* and processing the transaction requests. The transaction requests may include transactions that may involve accessing data that may be contained in a database. The database may be stored in a storage, such as secondary storage 350. The database may be replicated across one or more replicas. The replicas may provide, for example, failover capabilities, capabilities to hide performance dips, and/or other capabilities.

Figure 4:
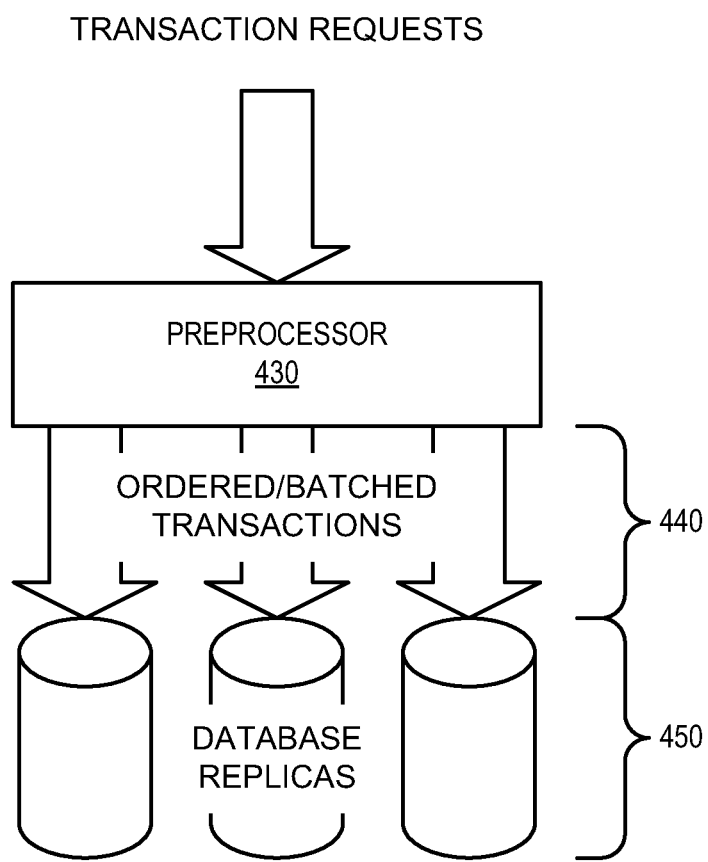
FIG. 4 illustrates an example architecture of a data management system.

FIG. 4 illustrates an example architecture of data management system 400. Referring to FIG. 4, data management system 400 may include a preprocessor 430 and database replicas 450. The preprocessor 430 may acquire (e.g., receive, read) one or more transaction requests from, for example, one or more client nodes 200*a-c*. The transaction requests may include requests for accessing (e.g., reading, writing) data that may be contained in a database managed by the database replicas 450. The preprocessor 430 may identify a logical serialization sequence for transactions that satisfy the requests. Database replicas 450 may execute the transactions in accordance with the identified logical serialization sequence.

The logical serialization sequence may indicate a logical order in which transactions may be executed in a manner that may be equivalent to a serial execution of the transactions. For example, suppose a plurality of transactions include a first transaction that writes a first record in a database, a second transaction which reads the first record to read the data that was written by the first transaction, and a third transaction that writes a second record in the database. A serial execution of the transactions may include executing the first transaction to completion then executing the second transaction to completion, and afterwards executing the third transaction to completion. Note that the serial execution includes executing the first transaction before the second transaction to ensure that the second transaction reads the data that was written by the first transaction.

An example of a logical serialization sequence that may be equivalent to the above serial execution of the transactions may include executing the third transaction followed by or in parallel with the first transaction and executing the second transaction after the first transaction completes execution. Note that in the example logical serialization sequence, the second transaction is executed after the first transaction completes to ensure that the second transaction reads the data that was written by the first transaction. Also note that the order in which the third transaction executes is independent of the execution of the first and/or second transactions since the third transaction does not involve a record that is associated with the first and second transactions.

The transactions may be organized into a batch of transactions 440 by the preprocessor 430. The transactions may be ordered in the batch in accordance with the logical serialization sequence. The batch of transactions 440 may be recorded by the preprocessor 430 (e.g., in secondary storage 350). The recorded batch of transactions 440 may be later used to recover from a failure that may occur during an execution of a transaction.

The batch of transactions 440 may be transferred (e.g., broadcast) by the preprocessor 430 to the database replicas 450. The batch of transactions 440 may be transferred to the database replicas 450 using a communication layer. The communication layer may be provided by a library, such as, for example the ZeroMQ library which is available from iMatrix Corporation.

The database replicas 450 may execute the batch of transactions 440 in an order specified in the batch of transactions 440. The order may cause the database replicas 450 to execute the transactions in a manner that may be equivalent to executing those same transactions serially. Execution of a transaction may involve acquiring all locks required by the transaction, executing the transaction to completion, and releasing the acquired locks. Non-conflicting transactions (e.g., transactions that do not require the same locks) may be executed in parallel and still maintain the logical serial sequence that was identified by the preprocessor 430.

It should be noted that a replica may include multiple entities (e.g., data servers) wherein an entity may store a subset of records that may be part of a total set of records stored in the database.

Deadlock freedom and/or equivalence to the preprocessor's transaction ordering may be achieved by restricting executions of transactions to those transactions that may satisfy the following properties: (1) for a pair of transactions $T_i$ and $T_j$ which both request locks on a record r, if $i<j$ then $T_i$ requests its locks on r before $T_j$ does (locks requested by a transaction should be granted in the order they are requested) and (2) a transaction that executes should execute to completion. Execution to completion may include committing the transaction to the database.

For example, suppose a first transaction involves writing a record and a second transaction involves reading the record. The preprocessor 430 may identify a logical serialization sequence for the first and second transactions where the first transaction executes prior to the second transaction. The preprocessor 430 may generate a batch of transactions 440 that reflects the identified logical serialization sequence. The preprocessor 430 may transfer the batch of transactions 440 to the database replicas 450, which may execute the batch of transactions 440 according to the logical serialization sequence. In this example, the database replicas 450 may execute the first transaction to completion and afterwards execute the second transaction to completion. Execution of the first transaction to completion may involve acquiring a lock on the record to prevent the record from being accessed by another transaction, performing the write operation, and releasing the lock after the write operation completes. Execution of the second transaction to completion may involve acquiring the lock on the record, performing the read operation, and releasing the lock after the read operation completes.

Figure 5:
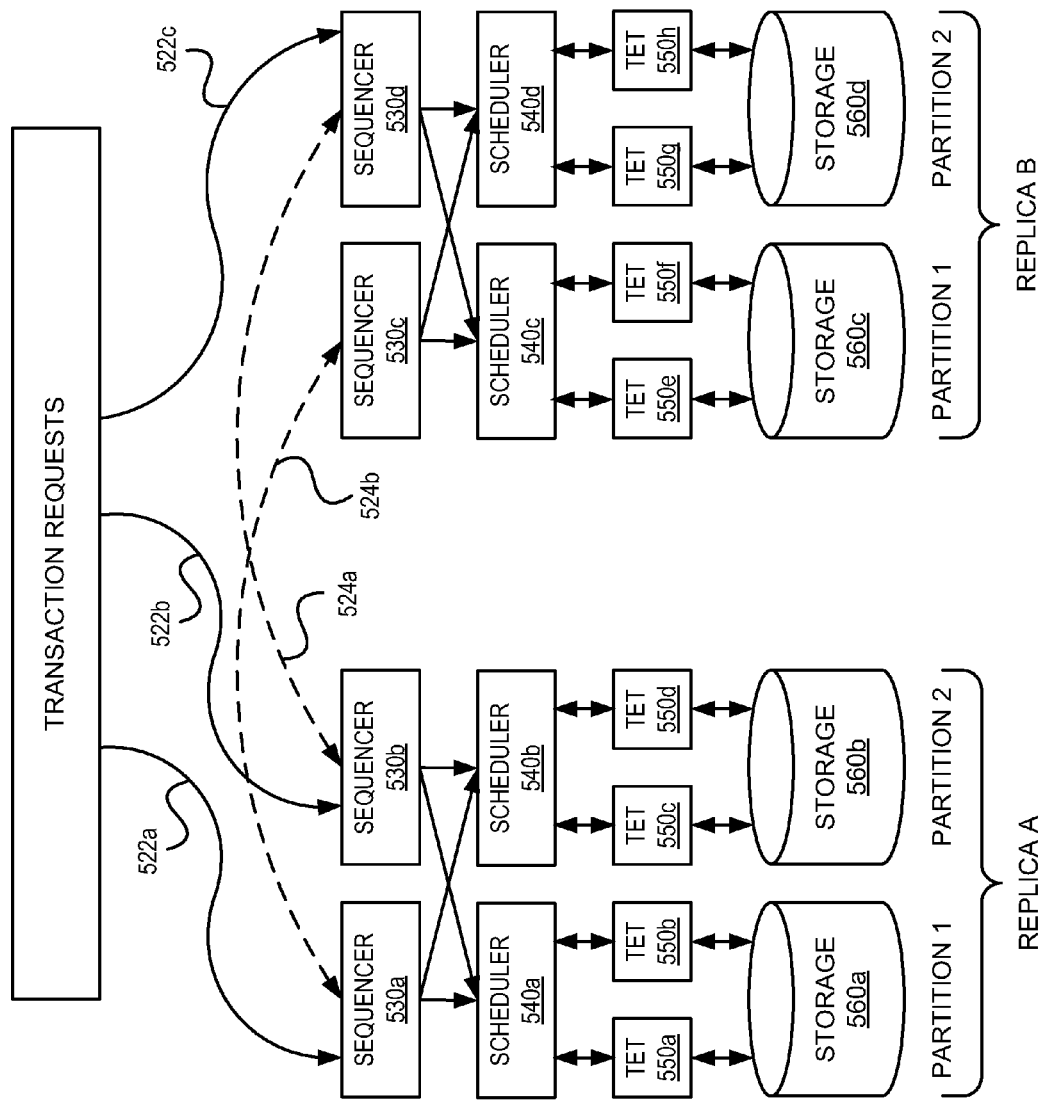
FIG. 5 illustrates an example embodiment of a data management system.

FIG. 5 illustrates an example embodiment of data management system 400. Referring to FIG. 5, data management system 400 may include sequencers 530*a-d*, schedulers 540*a-d*, transaction execution threads (TETs) 550*a-h*, and storage 560*a-d*. Functions associated with preprocessor 430 (FIG. 4) may be implemented by sequencers 530*a-d*. Moreover, functions associated with database replicas 450 may be implemented by schedulers 540*a-d*, TETs 550*a-h*, and storage 560 *a-d*.

The data management system 400 may include one or more replicas. A replica may include one or more partitions. A partition may be associated with a sequencer 530, scheduler 540, various TETs 550, and a storage 560. For example, a first partition for replica "A" may be associated with sequencer 530*a*, scheduler 540*a*, TETs 550*a-b*, and storage 560*a*. A partition node may include a sequencer 530, scheduler 540, various TETs 550, and a storage 560 associated with a partition. Thus, in the above example, a partition node for "partition 1" in replica "A" may include sequencer 530*a*, scheduler 540*a*, TETs 550*a-b*, and storage 560*a*.

A first partition in a first replica may be associated with second partition that may be in a second replica. The second partition may contain a mirror image of data contained in the first partition. For example, a "partition 1" in replica "A" may be associated with "partition 1" in replica "B". "Partition 1" in replica "B" may contain a minor image of the data contained in "partition 1" in replica "A". Here, "partition 1" of replica "A" and "partition 1" of replica "B" may be said to be part of a same replica group.

A sequencer 530 may collect transaction requests 522*a-c* that may be issued, for example, by client applications 234 running on client nodes 200. The transaction requests 522*a-c* may be collected over epochs (e.g., 10 millisecond epochs). At the end of an epoch, transaction requests 522*a-c* collected during the epoch may be compiled into a batch of transactions 440 that reflect transaction requests 522*a-c* collected during the epoch. Compiling may include identifying a logical serialization sequence for the transactions. The logical serialization sequence may order the transactions to ensure serial execution equivalence during their execution. The batch of transactions may be transferred to a scheduler 540 which may direct the TETs 550 to execute the transactions in the batch of transactions 440 in accordance with the identified logical serialization sequence.

The sequencer 530 may replicate the batch of transactions 440. Replicating the batch of transactions 440 may include making a copy of the batch and storing the copy in storage (e.g., secondary storage 350). The sequencer 530 may send the batch of transactions 440 to schedulers 540 associated with each partition within its replica. The batch of transactions 440 may include an epoch number associated with the batch of transactions 440, an identifier (ID) that may identify the sequencer 530, and transactions in the batch of transactions 440 that the partition may need to participate in. Replicated batches of transactions 440 may be transferred to sequencers 530 in other replicas as illustrated by lines 524*a-b*. For example, a batch of transactions 440 generated at sequencer 530*a* may be transferred to sequencer 530*c* as indicated by line 524*b*.

A scheduler 540 may schedule an execution of the transactions in the batch of transactions 440. Transaction execution may be scheduled using a locking scheme. The locking scheme may ensure a serial equivalence of execution of the batched transactions in accordance with the identified logical serialization sequence while allowing transactions to be executed concurrently by the TETs 550. For example, the locking scheme may be similar to a strict two-phase locking scheme but with the following added: (1) for a pair of transactions A and B that both request exclusive locks on some record r, if A appears before B in a serial order in the schedule, then A must request its locks on r before B does, and (2) locks must be granted to requesting transactions in an order in which those transactions request the locks.

A transaction may not execute until all locks required by the transaction are acquired. For example, the scheduler 540 may work through a batch of transactions 440 sent to the scheduler 540 by the sequencer 530 in a serial order defined by the schedule. For each transaction, the scheduler 540 may request all of the locks for that transaction. After all of the locks have been granted, the scheduler 540 may schedule the transaction for execution by a TET 550.

Transaction execution by a TET 550 may proceed in various phases. For example, in a first phase, the TET 550 may analyze the transaction's read and write sets, noting (a) elements of the read and write sets that are stored locally (i.e., at a partition node on which the TET 550 is executing), and (b) a set of participating partition nodes at which elements of the write set are stored. The set of participating partition nodes may be called "active participants" in the transaction; participating nodes at which only elements of the read set are stored may be called "passive participants."

In a second phase, the TET 550 may look up values of all records in the read set that are stored locally. Depending on the storage interface, this may mean, for example, making a copy of the record to a local buffer, or saving a pointer to the location in memory at which the record can be found.

In a third phase, results from the second phase may be forwarded to counterpart TETs 550 on actively participating partition nodes. Since passive participants typically do not modify data, they may not need to execute the actual transaction, and therefore may not have to collect any remote read results. If the TET 550 is executing at a passively participating node, then the TET 550 may be considered finished after this phase.

In a fourth phase, if the TET 550 is executing at an actively participating node, then the TET 550 may acquire read results which may include results of local reads (that may have been acquired in the second phase) and results of remote reads (that may have been forwarded appropriately by every participating node during the third phase). In the fourth phase, the TET 550 may collect the latter set of read results.

In a fifth phase, after the TET 550 has collected all read results, the TET 550 may proceed to execute all transaction logic, applying local writes. Nonlocal writes may be ignored, since they may be viewed as local writes by a counterpart TET 550 at the appropriate partition node, and applied there.

A storage 560 may handle accessing (e.g., writing, reading) data in the database. Storage 560 may include an interface that may be used to access the data, such as a create/insert, read, update, and delete (CRUD) interface and/or a Structured Query Language (SQL) interface. Note that the interface may be implemented by a database management system (DBMS), such as, for example, MySQL, Oracle, Sybase, Microsoft Access, and PostgreSQL.

The above-described locking scheme is an example of a way that may cause transaction execution to be equivalent to a serial execution in an order specified by a logical serialization sequence. It should be noted that transactions may be executed equivalent to the serial execution in the order specified by the logical serialization sequence in other ways that may or may not involve locks.

Figure 6:
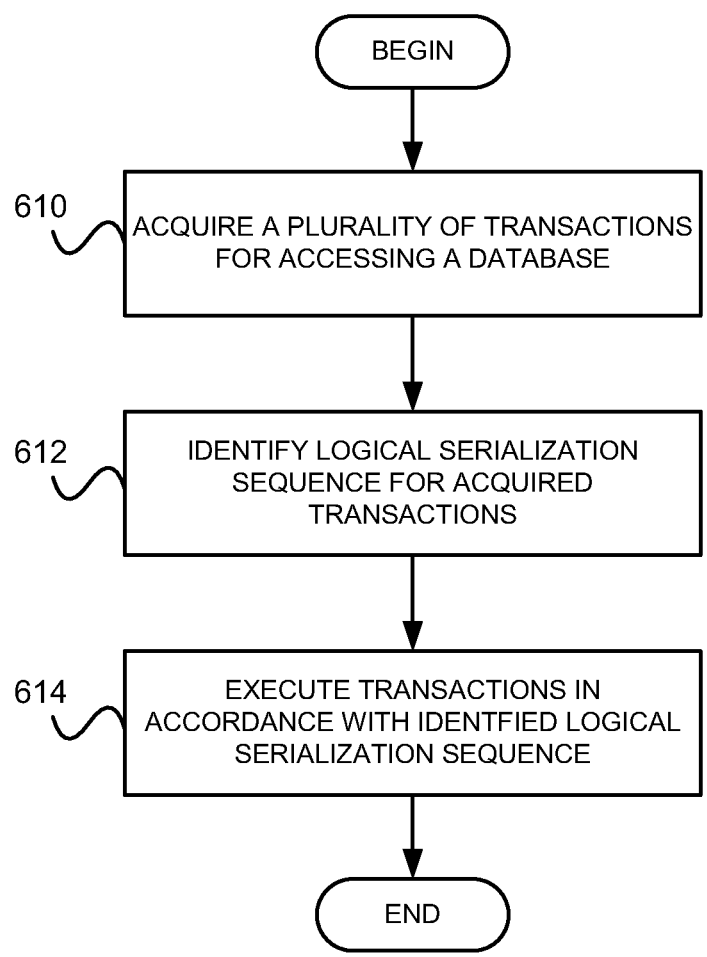
FIG. 6 illustrates a flowchart of example acts that may be used to execute transactions associated with accessing a database.

FIG. 6 illustrates a flowchart of example acts that may be performed, for example by data management system 400, to execute transactions associated with accessing a database. Referring to FIG. 6, at block 610, a plurality of transactions for accessing the database may be acquired. For example, the transactions may be acquired as transactions requests that may be issued by various client applications 234 to data management system 400. The requests may be transferred via network 120 to server node 300. At server node 300, data management system 400 may receive the requests and forward the requests to preprocessor 430.

At block 612, a logical serialization sequence for the acquired plurality of transactions may be identified. For example, as noted above, transaction requests generated by client applications 234 may be forwarded to preprocessor 430. The preprocessor 430 may identify the logical serialization sequence for transactions associated with the transaction requests.

At block 614, the acquired transactions may be executed in accordance with the identified logical serialization sequence. For example, the logical serialization sequence may indicate that a first transaction may be executed before a second transaction and that a third transaction may be executed either before or in parallel with the first transaction. The transactions may be executed where, for example, the first and third transactions execute in parallel and the second transaction executes after the first transaction has completed execution.

Figure 7:
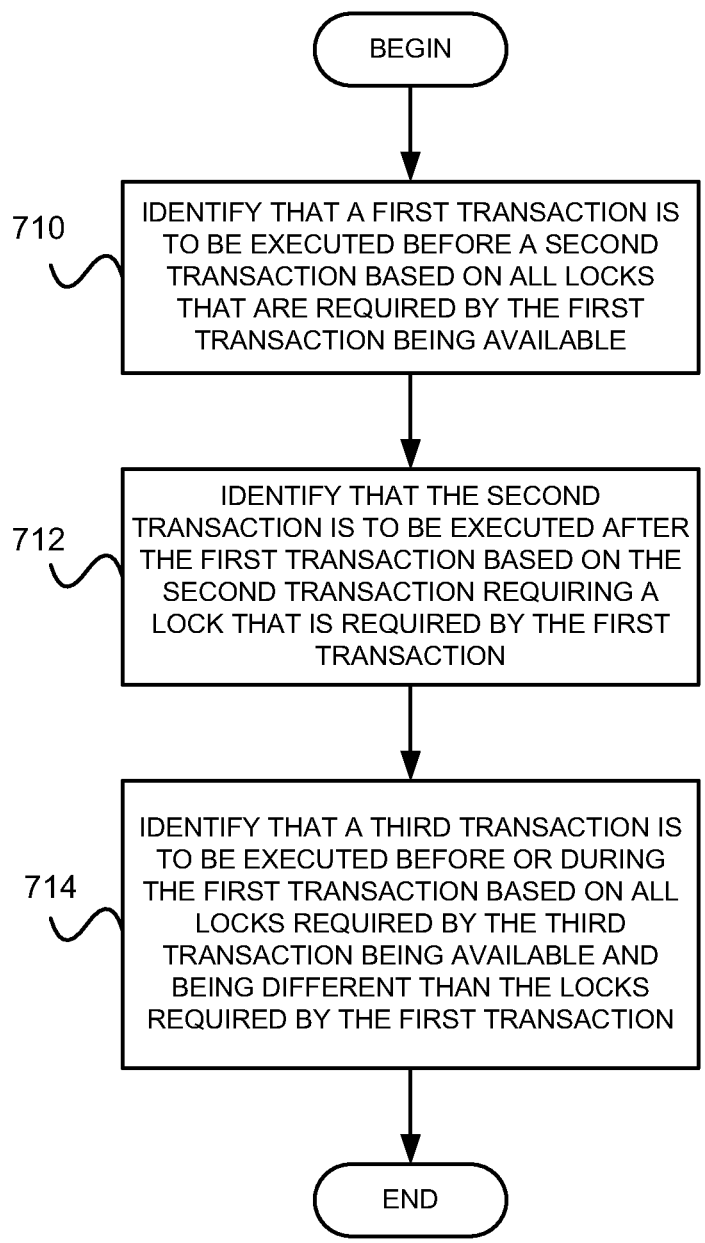
FIG. 7 illustrates a flowchart of example acts that may be used to identify an order of execution for transactions associated with accessing a database.

FIG. 7 illustrates a flowchart of example acts that may be performed, for example by data management system 400, to identify an order of execution for transactions associated with accessing a database. Referring to FIG. 7, at block 710, a first transaction may be identified to be executed before a second transaction based on all locks that are required for the first transaction being available. At block 712, the second transaction may be identified to be executed after the first transaction based on the second transaction requiring a lock that is required by the first transaction.

For example, suppose that the first transaction only requires a lock on a record in the database and that the lock is currently available. Further, suppose that the second transaction only requires the same lock. The preprocessor 430 may process the transactions and determine that all of the locks that are required for the first transaction are available. Thus, the preprocessor 430 may indicate in a batch of transactions 440 that the first transaction executes before the second transaction. The preprocessor 430 may further determine that all locks required by the second transaction will not be available until the first transaction completes. Thus, the preprocessor 430 may indicate in the batch of transactions 440 that the second transaction is to execute after the first transaction completes execution.

At block 714, a third transaction is identified to be executed before or during the first transaction based on all locks required by the third transaction being available and being different than the locks required by the first transaction. For example, suppose that in the above example, the preprocessor 430 receives the third transaction after receiving the second transaction. The preprocessor 430 may identify that all locks required by the third transactions are available. In addition, the preprocessor 430 may also identify that all locks required by the third transaction are different than the locks required by the first transaction. The preprocessor 430 may indicate in the batch of transactions 440 that the third transaction is to execute prior to or concurrently with the first transaction.

Figure 8:
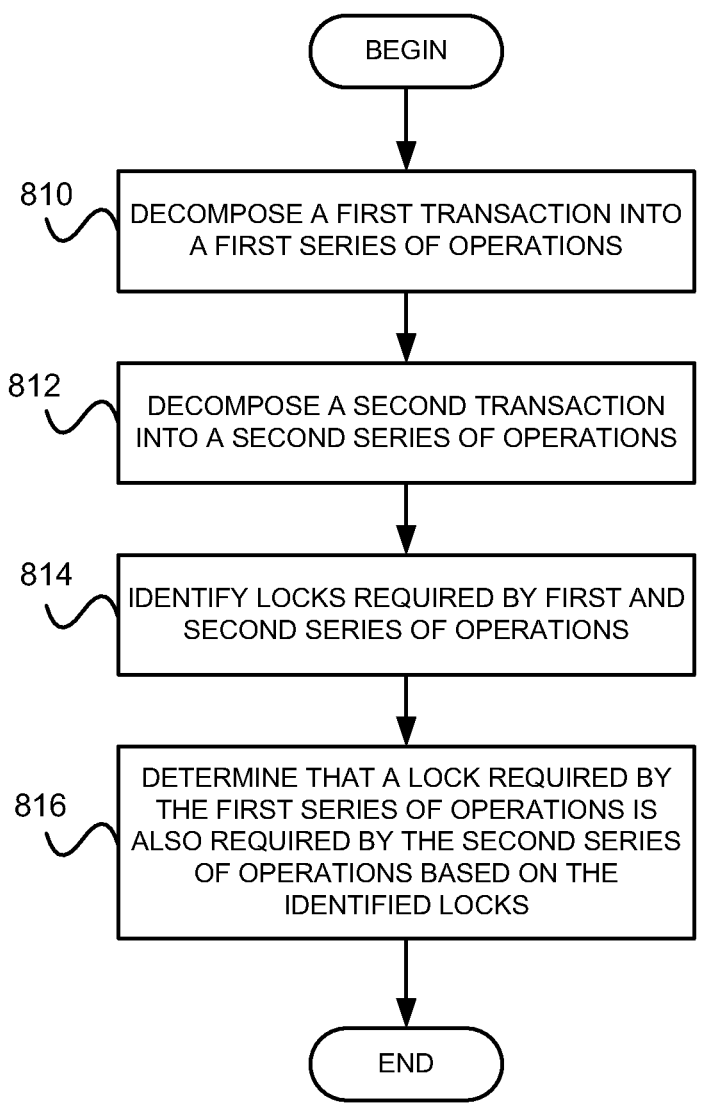
FIG. 8 illustrates a flowchart of example acts that may be used to identify that a lock required by a first transaction is also required by a second transaction.

FIG. 8 illustrates a flowchart of example acts that may be performed, for example by data management system 400, to identify that a lock required by a first transaction is also required by a second transaction. Referring to FIG. 8, at block 810 the first transaction may be decomposed into a first series of operations. Decomposing a transaction into a series of operations may involve identifying operations associated with the transaction. For example, the first transaction may involve reading a first record in the database followed by writing a second record in the database. Here, the reading and writing may be identified as separate operations associated with the transaction. Thus, the transaction may be decomposed into a series that includes a read operation that involves the first record followed by a write operation that involves the second record.

At block 812, the second transaction may be decomposed into a second series of operations. For example, the second transaction may involve reading the second record in the database followed by writing a third record in the database. In this example, the second transaction may be decomposed into a series that includes a read operation that involves the second record followed by a write operation that involves the third record.

At block 814, locks required by the first operations and the second operations may be identified. The locks may be identified based on the operations in the first and second series of operations. For example, in the above example, the first series includes a read operation involving the first record and a write operation involving the second record. Thus, locks required by the first transaction may include a lock on the first record and a lock on the second record. Likewise, the second series includes a read operation involving the second record and a write operation involving the third record. Thus, locks required by the second transaction may include a lock on the second record and a lock on the third record.

At block 816, a determination may be made that a lock required by the first series of operations is also required by the second series of operations. The determination may be made based on the identified locks. For example, in the above example, the locks required by the first transaction may be compared with the locks required by the second transaction and based on the comparison a determination may be made (e.g., by preprocessor 430) that the first and second transaction both require the lock associated with the second record.

Figure 9:
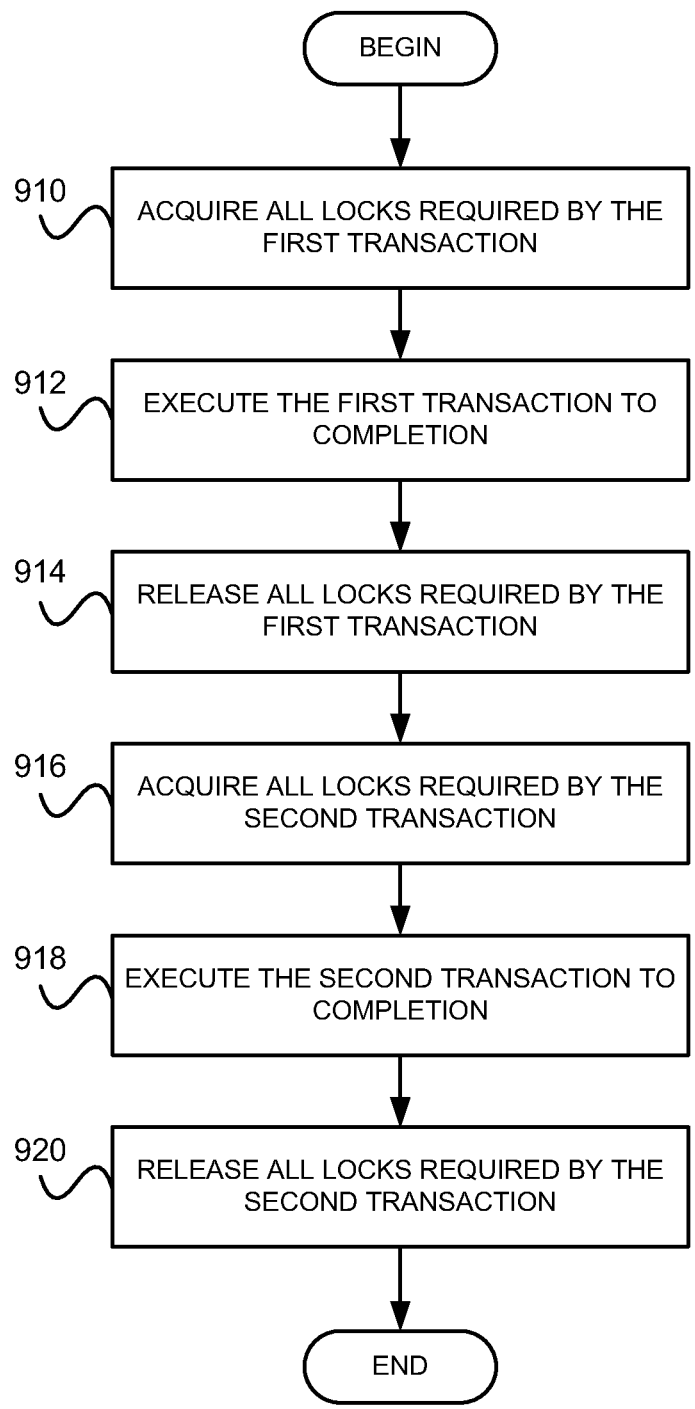
FIG. 9 illustrates a flowchart of example acts that may be used to execute a first transaction and a second transaction associated with accessing a database.

FIG. 9 illustrates a flowchart of example acts that may be performed, for example by data management system 400, to execute a first transaction and a second transaction associated with accessing a database. Referring to FIG. 9, at block 910, all locks required by the first transaction are acquired. Acquiring the locks may include requesting the locks and being granted the locks. The locks may be granted by a lock manager (e.g., lock manager 334), which may handle requests for locks and may grant the requested locks based on various criteria (e.g., the locks are available).

For example, suppose that the first transaction may involve writing a first record in the database and reading a second record in the database. The first transaction may be said to require locks for the first record and the second record in the database. In processing the first transaction, data management system 400 may request the locks required by the first transaction from lock manager 334, which may be part of data management system 400. Lock manager 334 may determine that the locks are available and grant the locks. The lock manager 334 may notify the data management system 400 that the requested locks have been granted. After granting the locks, the lock manager 334 may make the locks unavailable for other transactions. Making the locks unavailable may prevent acquiring the same locks for a different transaction while the locks are granted for the first transaction.

At block 912, the first transaction executes to completion. Completion may include, for example, committing the transaction to the database. For example, in the above example, the first transaction may be considered completed after the first record has been successfully written and the second record has been successfully read. Here, successfully reading and/or writing a record may include completion of a successful attempt to read and/or write the record, respectively. Thus, in the above example, if a first attempt to write the first record fails but a second attempt to write the first record succeeds, the record may be considered successfully written after the second attempt completes writing the first record.

At block 914, all locks required by the first transaction are released. For example, in the above example, after the first transaction executes to completion, the data management system 400 may issue a request to the lock manager 334 to release the locks on the first and second records. After receiving the request, the lock manager 334 may release the locks for the first and second records. Releasing the locks may include making the locks available. The lock manager 334 may notify the data management system 400 that the locks have been released.

At block 916, required locks for the second transaction may be acquired. The locks for the second transaction may be acquired after the locks required for the first transaction have been released. For example, continuing the above example, suppose that the second transaction involves reading the second record and writing a third record in the database. As noted above, releasing the locks for the first transaction may include the lock manager 334 making the lock for the second record available. The data management system 400 may acquire the locks required for the second transaction by issuing a request for the locks for the second and third records to the lock manager 334. The lock manager 334 may receive the request and grant the locks since the locks are available. After granting the locks, the lock manager 334 may notify the data management system 400 that the locks have been acquired.

At block 918, the second transaction may be executed to completion. For example, in the above example, as noted above, the second transaction may involve reading the second record and writing the third record. The second transaction may be considered executed to completion after the reading of the second record and the writing of the third record has successfully completed.

At block 920, all locks required by the second transaction are released. For example, in the above example, after the second transaction has executed to completion, the data management system 400 may issue a request to the lock manager 334 to release the locks for the second and third records. The locks may be released by the lock manager 334 and made available. The lock manager 334 may notify the data management system 400 that the locks have been released.

Some transactions may include various dependencies that may complicate acquiring locks for the transaction. For example, suppose a transaction involves reading a first record and using a result of the read as an index for a second record that is to be written. In this example, it may be said that the transaction is a dependent transaction as, in this example, the write operation is dependent on the read results of the operation. Dependent transactions may be decomposed (split) into multiple transactions and executed accordingly.

Figure 10A:
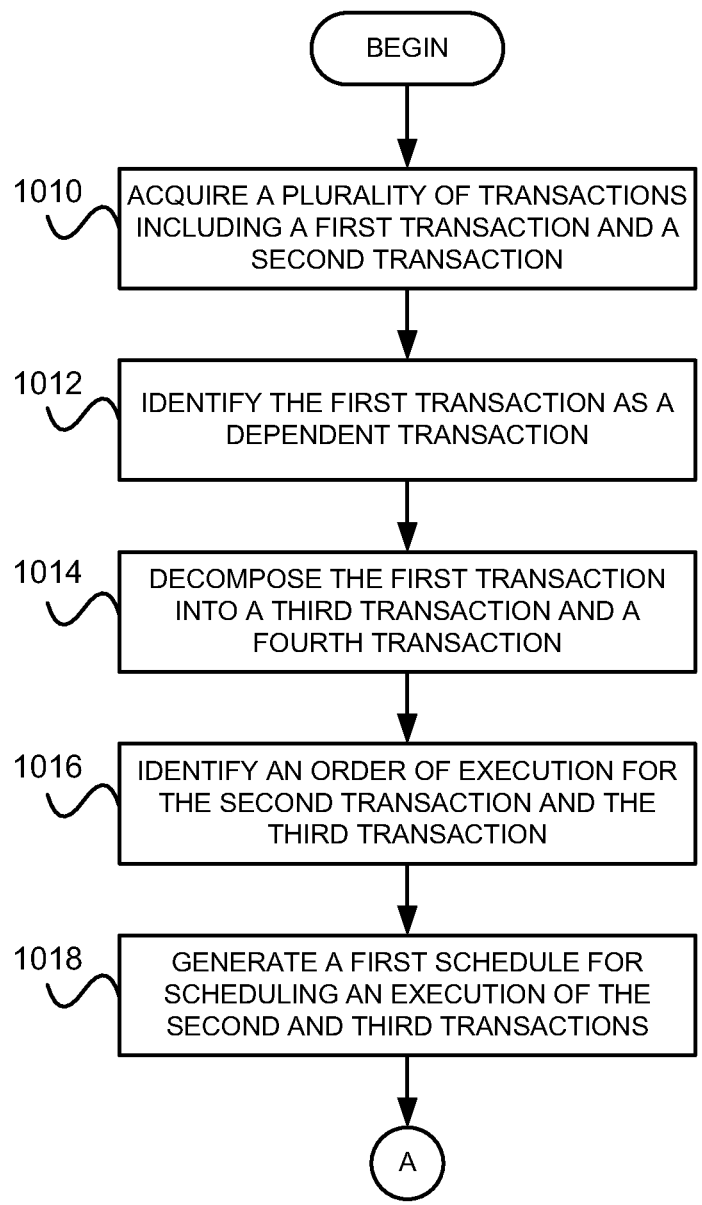
FIGS. 10A-B illustrate a flowchart of example acts that may be used to execute a first transaction and a second transaction associated with accessing a database, wherein the first transaction is a dependent transaction.
Figure 10B:
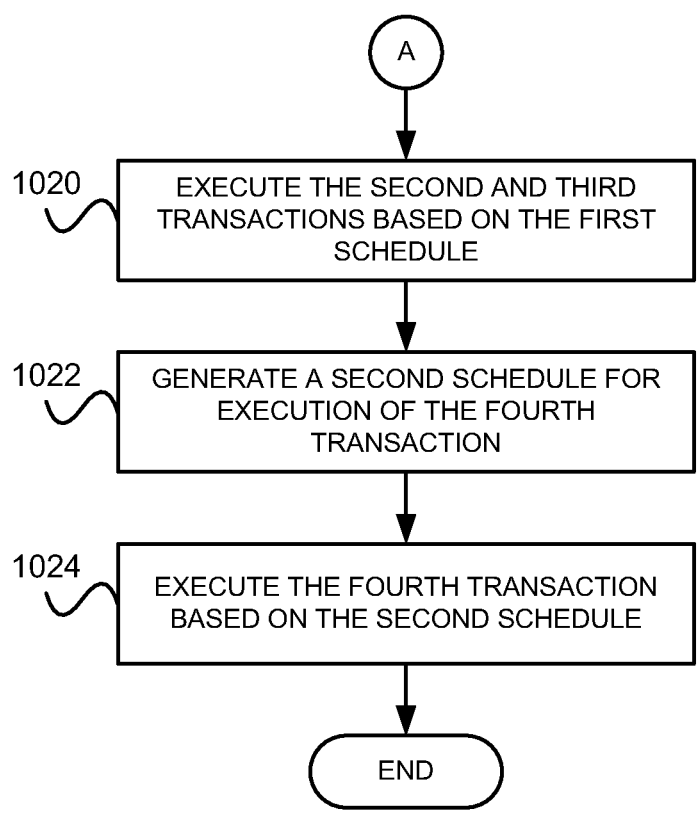

FIGS. 10A-B illustrate a flowchart of example acts that may be used to execute a first transaction and a second transaction associated with accessing a database, wherein the first transaction is a dependent transaction. Referring to FIG. 10A, at block 1010 a plurality of transactions may be acquired. The plurality of transactions may include a first transaction and a second transaction. For example, the first and second transactions may be generated by one or more client applications 234 and may be acquired (e.g., received) from the client applications 234 by preprocessor 430 via network 120.

At block 1012, the first transaction may be identified as a dependent transaction. For example, the first transaction may be processed by the preprocessor 430 which may determine that the first transaction includes a third and fourth transaction, where the fourth transaction is dependent on a result of the third transaction.

At block 1014, the first transaction may be decomposed into a third transaction and a fourth transaction. For example, after identifying that the first transaction includes the third and fourth transaction, the preprocessor 430 may split the first transaction into the third transaction and the fourth transaction.

At block 1016, an order of execution for the second transaction and the third transaction may be identified. The order of execution may be identified based on, for example, an availability of locks that may be required by the second and third transactions. Further criteria for determining the order of execution may include the order in which the transactions were received. For example, suppose that the preprocessor 430 determines that all locks required by the second transaction and the third transaction are available. Further, suppose that the first transaction was received by the preprocessor 430 prior to the second transaction. Since the first transaction was received prior to the second transaction, the third transaction was split from the first transaction, and the locks required by the third transaction are available, the preprocessor 430 may identify an order of execution for the third and second transactions where the third transaction executes before the second transaction.

At block 1018, a first schedule for scheduling an execution of the second and third transactions may be generated. For example, after identifying the order of execution of the second and third transactions, the preprocessor 430 may generate the first schedule. The first schedule may reflect the identified order of execution.

At block 1020, the second and third transactions are executed based on the first schedule. For example, after generating the first schedule, the preprocessor 430 may forward the first schedule to the database replicas 450. The database replicas 450 may execute the second and third transactions based on the first schedule. Specifically, in this example, since the first schedule indicates the third transaction executes before the second transaction, the database replicas 450 may execute the third transaction and after the third transaction completes execution, execute the second transaction.

At block 1022, a second schedule is generated for execution of the fourth transaction. For example, the preprocessor 430 may generate the second schedule to schedule an execution of the fourth transaction.

At block 1024, the fourth transaction may be executed based on the second schedule. For example, after generating the second schedule, the preprocessor may forward the second schedule to the database replicas 450.

Note that in data management system 400, batches may be processed by the database replicas 450 in an order in which they are received by the database replicas 450. Thus, preprocessor 430 may forward the second schedule to the database replicas 450 at any time after the first schedule has been received by the database replicas 450.

The following example may be helpful in understanding the above. Suppose, for example, a transaction T is to be executed by data management system 400 (FIG. 3). A client node 200 (FIG. 2) may send a request to execute transaction T to the server node 300 during a time epoch X. The transaction T may be received at a sequencer 530 during the time epoch X.

The sequencer 530 (FIG. 5) may analyze and annotate T. Specifically, the sequencer 530 may determine whether the transaction is a dependent transaction. If the transaction is a dependent transaction, the transaction may be executed in two phases.

A first phase may involve determining what locks are likely to be needed by the transaction. Here, the transaction may be analyzed (e.g., statically), secondary index lookups may be performed, a "dry run" of the transaction may be performed, and the transaction may be annotated using results of the "dry run". Note that the "dry run" may involve performing all read operations associated with the transaction but not committing any write operations associated with the transaction.

A second phase may involve executing the transaction with full knowledge of the results of the first phase. The second phase may include rechecking the results from the first phase and if the results have been invalidated (e.g., by a database mutation that may have occurred between the first phase and the second phase), execution of the transaction may be deterministically aborted and restarted. Otherwise, if the results have not been invalidated, the transaction may be executed.

Execution of transaction T may include the following. Suppose sequencer 530a receives transaction T. Sequencer 530a may assign transaction T to a batch which may be associated with "partition 1" and time epoch X. Sequencer 530a may participate in a synchronous or asynchronous agreement protocol with sequencer 530c. Sequencer 530c may have also received transaction T and may have assigned it to a particular batch for time epoch X. Sequencers 530a and 530c may globally confirm the value of the batches to ensure they are consistent.

If the batches are consistent, sequencer 530a may send its batch to schedulers 540a and 540b. Similarly, sequencer 530c may send its batch to schedulers 540c and 540d. A scheduler 540 may perform the following.

The scheduler 540 may request all the locks for T (e.g., from the lock manager 334). The scheduler 540 may wait until all of the locks for T have been granted. After the locks have been granted, the scheduler 540 may perform all local reads required by T. A local read may be a read operation for data that is stored in a partition that is "local" to the scheduler 540. For example, a partition that may be considered "local" to scheduler 540a includes "partition 1" in storage 560a. Thus, for scheduler 540a, a local read operation may be a read operation that reads data in "partition 1" in storage 560a.

Results from the local reads may be transferred (e.g., broadcast) to other schedulers 540 in a replica that may also be involved in the execution of transaction T. The scheduler 540 may wait until read results from other schedulers 540 involved in the execution of transaction T are received. After these read results are received, the scheduler 540 may compute write operations associated with transaction T. The write operations may be executed by TETs 550 associated with the scheduler 540 (which may thereby "commit" the write operations to storage 560). After execution of the write operations completes, the scheduler 540 may release the locks associated with transaction T. For example, scheduler 540 may request that the lock manager 334 release the locks that were granted for transaction T.

The foregoing description of embodiments is intended to provide illustration and description, but is not intended to be exhaustive or to limit the invention to the precise form disclosed. Modifications and variations are possible in light of the above teachings or may be acquired from practice of the invention. For example, while a series of acts has been described above with respect to FIGS. 6, 7, 8, 9, and 10A-B, the order of the acts may be modified in other implementations. Further, non-dependent acts may be performed in parallel.

Also, the term "user", as used herein, is intended to be broadly interpreted to include, for example, a computing device (e.g., fixed computing device, mobile computing device) or a user of a computing device, unless otherwise stated.

It will be apparent that one or more embodiments, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

Further, certain features of the invention may be implemented using computer-executable instructions that may be executed by processing logic, such as processing logic 220 and/or processing logic 320. The computer-executable instructions may be stored on one or more non-transitory tangible computer-readable storage media. The media may be volatile or non-volatile and may include, for example, DRAM, SRAM, flash memories, removable disks, non-removable disks, and so on.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It is intended that the invention not be limited to the particular embodiments disclosed above, but that the invention will include any and all particular embodiments and equivalents falling within the scope of the following appended claims.

What is claimed is:

1. A method comprising:
    acquiring a plurality of transactions for accessing a database, the plurality of transactions including a first transaction, a second transaction, and a third transaction, the first transaction being received before the second transaction and the third transaction being received after the second transaction, the database being associated with a plurality of locks;
    identifying a logical serialization sequence for executing the first, second, and third transactions, the identifying including:
        identifying that the first transaction is to be executed before the second transaction based on all locks, in the plurality of locks, that are required by the first transaction being available,
        identifying that the second transaction is to be executed after the first transaction has completed execution based on the second transaction requiring a lock, in the plurality of locks, that is required by the first transaction, and
        identifying that the third transaction is to be executed before or during execution of the first transaction based on all locks, in the plurality of locks, required by the third transaction being different than the locks required by the first transaction; and
    executing the first, second, and third transactions, based on the identified logical serialization sequence.

2. The method of claim 1, further comprising:
    decomposing the first transaction into a first access set that contains a write set or a read set associated with the first transaction;
    decomposing the second transaction into a second access set that contains a write set or a read set associated with the second transaction; and
    determining that a lock, in the plurality of locks, required by the first access set is also required by the second access set.

3. The method of claim 1, further comprising:
    acquiring all of the locks required by the first transaction;
    executing the first transaction to completion;
    releasing all of the locks required by the first transaction;
    acquiring all of the locks required by the second transaction; and
    executing the second transaction.

4. The method of claim 1, wherein the lock required by the first transaction and the second transaction is associated with a record in the database.

5. A method comprising:
    acquiring a plurality of transactions for accessing a database, the plurality of transactions including a first transaction and second transaction, the first transaction being received before the second transaction, the database being associated with a plurality of locks;
    decompose the first transaction into a third transaction and a fourth transaction based on:
        the first transaction including the third transaction and the fourth transaction, and
        the fourth transaction being dependent on a result of the third transaction;
    identifying a logical serialization sequence for executing the second and third transactions, the identifying including:
        identifying that the third transaction is to be executed before the second transaction based on all locks, in the plurality of locks, that are required by the third transaction being available, and
        identifying that the second transaction is to be executed after the third transaction has completed execution based on the second transaction requiring a lock, in the plurality of locks, that is required by the third transaction; and
    executing the second, and third transactions, based on the identified logical serialization sequence.

6. A non-transitory tangible computer-readable medium storing computer-executable instructions for:
    acquiring a plurality of transactions for accessing a database, the plurality of transactions including a first transaction, a second transaction, and a third transaction, the first transaction being received before the second transaction and the third transaction being received after the second transaction, the database being associated with a plurality of locks;
    identifying a logical serialization sequence for executing the first, second, and third transactions, the identifying including:
        identifying that the first transaction is to be executed before the second transaction based on all locks, in the plurality of locks, that are required by the first transaction being available,
        identifying that the second transaction is to be executed after the first transaction has completed execution based on the second transaction requiring a lock, in the plurality of locks, that is required by the first transaction, and
        identifying that the third transaction is to be executed before or during execution of the first transaction based on all locks, in the plurality of locks, required by the third transaction being different than the locks required by the first transaction; and
    executing the first, second, and third transactions, based on the identified logical serialization sequence.

7. The computer-readable medium of claim 6, further comprising computer-executable instructions for:
    decomposing the first transaction into a first access set that contains a write set or a read set associated with the first transaction;
    decomposing the second transaction into a second access set that contains a write set or a read set associated with the second transaction; and
    determining that a lock, in the plurality of locks, required by the first access set is also required by the second access set.

8. The computer-readable medium of claim 6, further comprising computer-executable instructions for:
    acquiring all of the locks required by the first transaction;
    executing the first transaction to completion;
    releasing all of the locks required by the first transaction;
    acquiring all of the locks required by the second transaction; and
    executing the second transaction.

9. The computer-readable medium of claim 6, wherein the lock required by the first transaction and the second transaction is associated with a record in the database.

10. A system comprising:
processing logic for:
acquiring a plurality of transactions for accessing a database, the plurality of transactions including a first transaction, a second transaction, and a third transaction, the first transaction being received before the second transaction and the third transaction being received after the second transaction, the database being associated with a plurality of locks,
identifying a logical serialization sequence for executing the first, second, and third transactions, the identifying including:
identifying that the first transaction is to be executed before the second transaction based on all locks, in the plurality of locks, that are required by the first transaction being available,
identifying that the second transaction is to be executed after the first transaction has completed execution based on the second transaction requiring a lock, in the plurality of locks, that is required by the first transaction, and
identifying that the third transaction is to be executed before or during execution of the first transaction based on all locks, in the plurality of locks, required by the third transaction being different than the locks required by the first transaction, and
executing the first, second, and third transactions, based on the identified logical serialization sequence.

11. The system of claim 10, wherein the processing logic is further for:
executing the first, second, and third transactions based on the schedule.

12. The system of claim 10, wherein the processing logic is further for:
decomposing the first transaction into a first access set that contains a write set or a read set associated with the first transaction;
decomposing the second transaction into a second access set that contains a write set or a read set associated with the second transaction; and
determining that a lock, in the plurality of locks, required by the first access set is also required by the second access set.

13. The system of claim 10, wherein the processing logic is further for:
acquiring all of the locks required by the first transaction;
executing the first transaction to completion;
releasing all of the locks required by the first transaction;
acquiring all of the locks required by the second transaction; and
executing the second transaction.

14. The system of claim 10, wherein the lock required by the first transaction and the second transaction is associated with a record in the database.

* * * * *